July 31, 1956  H. D. WOLCOTT  2,756,729
APPARATUS FOR SUPPLYING WATER TO THE FUEL AND
AIR MIXTURE FOR INTERNAL-COMBUSTION ENGINE
Filed Jan. 17, 1955  2 Sheets-Sheet 2

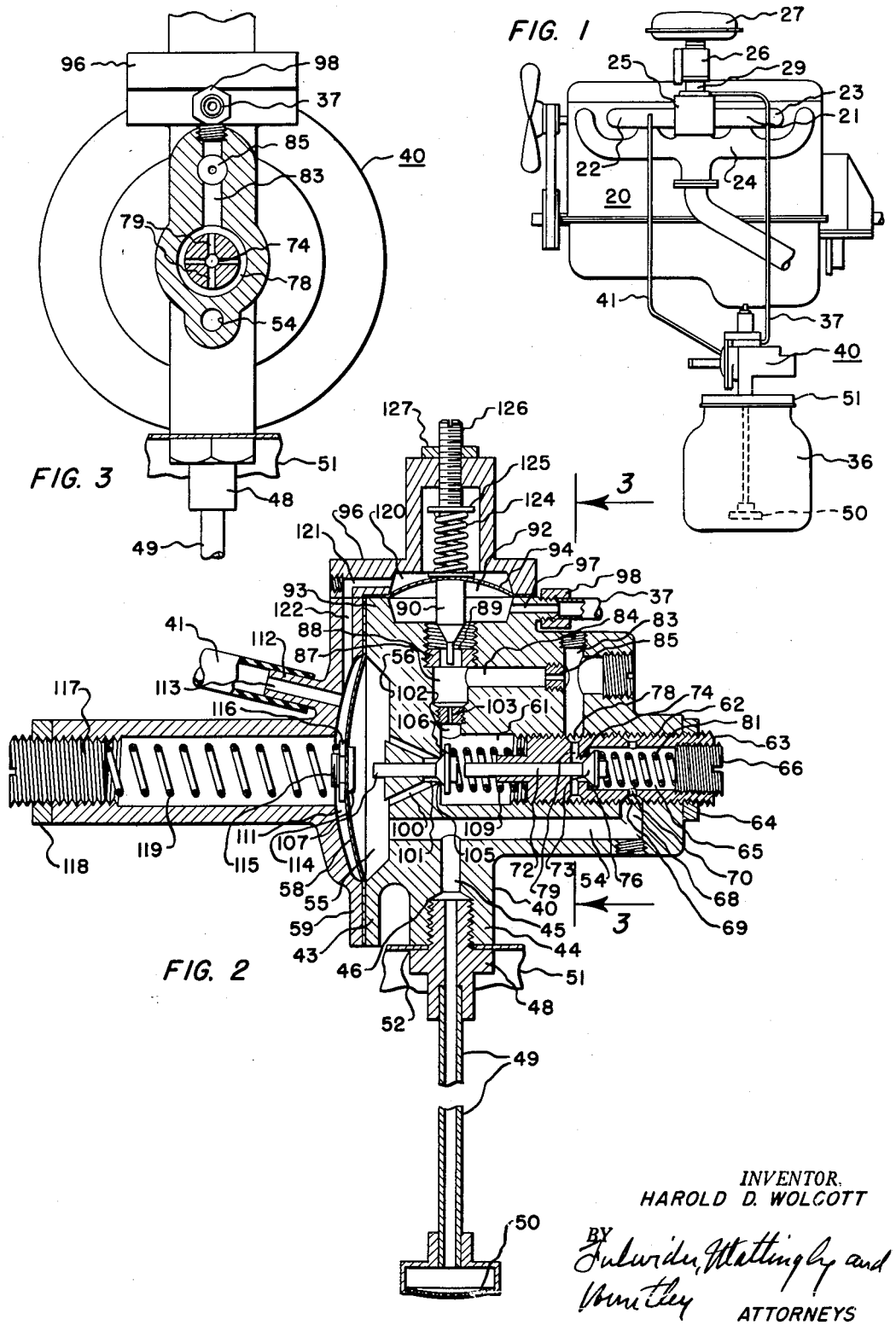

INVENTOR.
HAROLD D. WOLCOTT

BY Fulwider, Mattingly
and Huntley  ATTORNEYS

United States Patent Office 2,756,729
Patented July 31, 1956

2,756,729

APPARATUS FOR SUPPLYING WATER TO THE FUEL AND AIR MIXTURE FOR INTERNAL-COMBUSTION ENGINE

Harold D. Wolcott, La Jolla, Calif., assignor of one-half to Victor Lundy and Lottie L. Crawford, San Diego, Calif.

Application January 17, 1955, Serial No. 482,061

12 Claims. (Cl. 123—25)

The present invention relates to apparatus for and a method of supplying water to the fuel and air mixture for an internal-combustion engine.

In carrying out my invention, I provide conduit means for conducting water from a storage tank to the passage leading from the carburetor to the combustion chamber of an internal-combustion engine, such passage being the intake manifold when the engine is of the multi-cylinder type. I also provide valve means, for controlling the flow of water, and provide means which is associated with the valve means and which is responsive to the variation in pressure in the fuel-mixture passage for increasing and decreasing the flow of water to said passage in response to increase and decrease, respectively, of pressure in said passage.

In carrying out the invention, I divide part of the conduit means into parallel conduits, each of which is controlled by a control valve. and, the means, which is responsive to variation in pressure in the intake passage in the combustion engine, effects the opening of one of said valves in response to increase in pressure in the passage and effects the opening of the other of said valves in response to a predetermined higher pressure in the intake passage.

The purpose of the foregoing is to supply increased amounts of water to the combustion chamber with the fuel moisture as the load on the engine increases. As, for example, cruising speed of an automobile, the supplying of water to the engine is not necessary, and, in fact, the supplying is undesirable. Accordingly, the pressure responsive means, hereinbefore referred to, is utilized to prevent the flow of water to the combustion chamber when the pressure in the intake manifold decreases to a predetermined minimum, the minimum being the degree at and below which the addition of water to the mixture would not be desirable.

In one embodiment of the invention, I utilize the Venturi principle of lifting water from a low level tank. In another embodiment, in which the water tank is above the fuel intake of the engine, I provide mechanism which is responsive to the pressure in the fuel intake for shutting off the flow of water when the engine is idle.

Further objects and advantages will be apparent from the following description, reference being had to the accompanying drawings wherein preferred embodiments of the invention are illustrated.

In the drawings:

Fig. 1 is a side view of an internal-combustion engine showing my improved apparatus for supplying water to the fuel mixture for the engine;

Fig. 2 is a vertical cross-section of the composite valve;

Fig. 3 is a sectional view taken along line 3—3 of Fig. 2;

Figure 4:
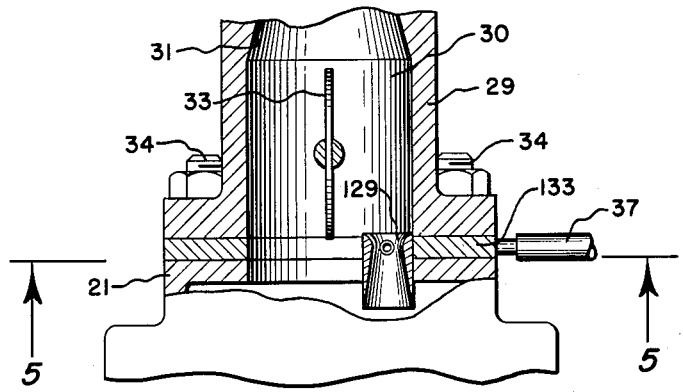
Fig. 4 is a view partly in section showing the fuel mixture passage between the fuel inlet and the dual manifolds, and showing the throttle valve and the venturi used for lifting water to the fuel mixture passage.
Figure 5:
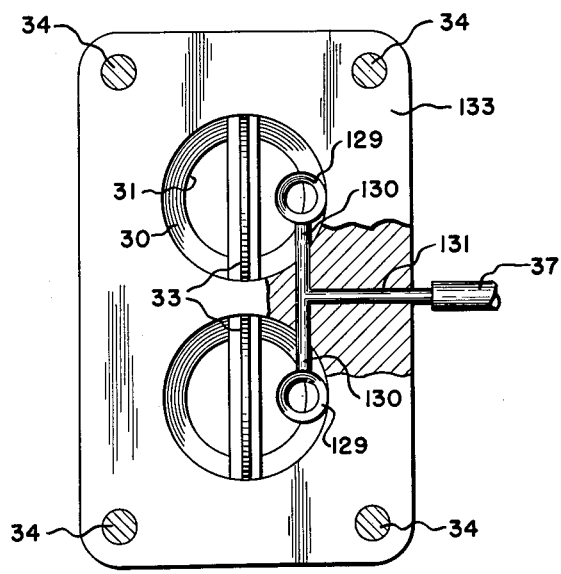
Fig. 5 is a top plan view of an assembly including a plate and venturis, part of the plate being shown in section to show the dual system therein.

Referring more in detail to the drawings, the engine 20 is shown as of the multi-cylinder type and includes a dual fuel mixture intake manifold 21, one division of the manifold being indicated at 22 and the other at 23. The exhaust manifold is indicated at 24, having a section 25 in heat-exchange relationship with manifold divisions 22 and 23. Air is admitted to the carburetor 26 through an air cleaner 27. Carburetor 26 is carried by a fixture 29 having passages 30 including a venturi, the lower part of the latter being shown at 31. Passages 30 also carry the butterfly type of throttle valves 33. Fixture 29 is secured to the manifolds 22 and 23 by bolts 34.

Fig. 1 also shows the water reservoir 36, the tube 37 for conducting water from the reservoir, the intake passage 30, the composite valve 40 for controlling the flow of water from the reservoir to the tube 37, and the tube 41 which is connected to intake manifold 21 and valve 40 and is responsive to the pressure in the intake manifold for regulating valve 40.

Referring more in detail to the composite valve 40 and particularly to Figs. 2 and 3, the valve includes a main body 43, formed preferably of a casting. The bottom of the casting 43 is provided with a hollow boss 44, the vertically extending passage therein being indicated at 45. The lower end of the passage 45 is enlarged as at 46 and threaded to receive a coupling 48. Coupling 48 carries a tube 49, the bottom of the latter carrying a screen fixture 50. The lid 51 of the reservoir 36 is clamped between the bottom of the boss 44 and a shoulder 52 on the coupling 48.

Passage 45 merges with a horizontally-extending passage 54 in casting 43. The left end of passages 54 connects with a chamber 55; this chamber is formed by the left wall section 56 of casting 43 and a flexible diaphragm 58. This diaphragm has its rim portion clamped between wall section 56 and a second casting 59. Casting 59 is secured in diaphragm-sealing relationship with casting 43 as by screws (not shown).

The central portion of the casting 43 is drilled from the right side to form a chamber 61. The drilled opening is threaded as at 62 for receiving a threaded bushing 63. The bushing is locked in position by a lock nut 64. The right end of bushing 63 is hollow and forms a chamber 65. The right or outer end of chamber 65 is closed by a screw plug 66. Passage 46 is dispersed below the centrally-located drilled opening and merges with a vertically-extending passage 68. Passage 68 communicates with a peripheral groove 69 in bushing 63 and a series of spaced and radially-extending holes 70 connects the groove 69 with the chamber 65 in bushing 63.

The left end of bushing 63 is drilled horizontally for slidably receiving the stem 72 of a poppet valve 73. The head of valve 73 extends into chamber 65 of the bushing and is arranged to control the flow of water from chamber 65 to a passage 74 in the bushing. The bushing 63 is provided with a valve seat 76 for that purpose. Passage 74 is connected with a groove 78 in the periphery of bushing 63 by spaced and radially-extending passages 79. Valve 73 is normally urged toward its seat 76 by a spring 81; this spring is interposed between the head of the valve and the inner side of screw plug 66.

Groove 78 communicates with a vertically-extending passage 83, formed in the casting 43 and extending upwardly from the groove. Passage 83 is connected with a horizontally-extending passage 84 through a restrictor 85. Passage 84 merges with a vertically-extending passage 87, the upper end of which is enlarged and threaded to receive a hollow and exteriorly threaded valve seat member 88. The valve seat is indicated at 89. A valve 90 in cooperation with seat 89 is adapted to control the flow of water through the seat member 88. Water, flowing upwardly through seat member 88, enters a chamber 92, the lower portion of the latter being formed by the upper section 93 of casting 43 and a flexible diaphragm 94. The outer edges of diaphragm 94 is clamped in sealing relationship with casting section 93 and the lower surface of a casting 96 by screw (not shown), which fastens the casting 96 to the casting 43. Water flows through chamber 92 to passage 97 which latter communicates with tube 37. The tube is fastened to the casting 43 by a coupling 98.

A main path for water, from reservoir 36 to tube 37, is also provided. It includes tube 49, coupling 48, passage 45, the left end section of passage 54, chamber 55, a series of ducts 100, chambers 101 and 61, vertically-extending passage 102, restriction 103 to passage 87, whence it flows to tube 37 as previously described. Ducts 100 merge with chamber 101, which latter merges with chamber 61. A valve seat 105 is formed at the junction of chambers 101 and 61. The flow of water from chamber 101 to chamber 61 is controlled by a valve 106. Valve 106 is guided by its stem 107 and is normally urged toward the right, i. e., toward its seat 105 by a spring 109. This spring is interposed between the head of the valve and the bushing 63.

The casting 59 and diaphragm 58 cooperate to form a sealed chamber 111 to the left of the diaphragm. Casting 59 includes a hollow boss 112 whose passage 113 is connected with the tube 41; therefore the pressure in chamber 111 follows and is substantially the same as the pressure in manifold 22. The diaphragm is shown in the position it must assume when a relatively high vacuum, i. e., relatively low pressure is present in the manifold. In the position illustrated, both valves 106 and 73 are closed on their respective seats. A spring 119 normally urges diaphragm 58 to the right. A combination valve stem pusher 114 and spring retainer 115 is carried centrally of the diaphragm. This element is in the form of a flat-headed screw, the head thereof forming the pusher and the stem or shank the retainer. Said screw is held in place by a nut 116. One end of the coil spring 119 surrounds the screw shank and the other end abuts at screw plug 117. This screw plug is locked in spring compression adjusted position by a nut 118.

As the pressure in the intake manifold increases, the diaphragm 58 is moved to the right to engage the left end of valve stem 107. At a predetermined pressure in chamber 111, it will start moving the valve 106 from its seat 105. Water, in limited amount, will then flow from reservoir 36 to the intake manifold through the path previously described. Upon gradual increase in pressure in chamber 111, it will gradually push the valve farther from its seat to thereby permit the increase of flow of water to the intake manifold. Upon further increase in pressure in the intake manifold, the right end of valve 105 will engage the left end of stem 72 of valve 73 and open the latter gradually with gradual increase in pressure in the intake manifold. Obviously, the reverse occurs as the pressure in the intake manifold decreases. In this manner the flow of water to the intake manifold is modulated in accordance with variation in pressure above a predetermined pressure, in said manifold.

It is understood by those skilled in the art that the pressure in the manifold varies in response to the demand for power from the engine. When the power demand is relatively light, for example at cruising speed, no water need be supplied to the fuel mixture; in fact it is desirable to feed water to the fuel mixture only when the demand for power exceeds a predetermined amount. I have regulated the valve springs so that valve 106 starts to open when the demand for power from the engine is approximately twenty-five percent of the available power of the engine, and valve 73 starts to open when the demand for power from the engine is approximately forty percent of the available power of the engine. Thus the flow of water is increased as the demand for power is increased, and no water is supplied to the engine when the demand for power is relatively light, as, for example, during cruising of an automobile. When the demand for power suddenly increases, as for example, when increased power is necessary to overtake and pass another automobile, the valve or valves are opened to supply water to the fuel mixture.

Water may be fed from a reservoir 36 to the intake mixture in any suitable way. It may flow by gravity; in which case, the reservoir will be above the intake manifold. In that case, I provide a shut-off valve 90 which closes as soon as the pressure in the manifold rises to near atmospheric pressure and opens when the pressure in the manifold decreases to slightly below atmospheric pressure.

Obviously the diaphragm 58 could carry the valve 90 to actuate the same to move it onto and away from its seat 89, at the desired pressure. However, I prefer to employ the diaphragm 94 for this purpose. In carrying this out, the casting 96 and diaphragm 94 cooperate to form a sealed chamber 120. Casting 96 is drilled to form a passage 121 which latter is connected with chamber 120 and with a passage 122 in casting 59. Passage 122 is connected with chamber 111, which latter has been described as connected with the intake manifold whereby chamber 120 is also responsive to the pressure in the intake manifold. Thus when the engine is stopped, the increase in pressure to near atmosphere, in the manifold will close valve 90 on its seat 89. This is essential since at that time both valves 106 and 73 are open, and being open, water would drain from the reservoir 36, by siphonic action, into the intake manifold.

As soon as the engine is started, valve 90 will be moved from its seat 89. Then as the load on the engine decreases, valve 73 will close, and, as the load decreases further, valve 106 will restrict or close, depending on the demand for power. The exact pressure values at which the valve 90 opens and closes are controlled by a spring 124, which spring is interposed between the top of the diaphragm 94 and a disk 125. Disk 125 is carried by a screw 126. Screw 126 is threaded through the casting 96 and is locked in adjusted position by a nut 127.

If it is desirable to locate the reservoir 36 below the inlet manifold, the water can be lifted from the reservoir in any suitable manner. I prefer to use the flow of air or fuel mixture for creating a difference in pressure between that in the reservoir and that in the tube 37. To accomplish this, I provide a Venturi or Venturis 129 in the fuel mixture passage, as is more clearly shown in Fig. 4. The Venturis are carried by a plate 133, which latter is clamped between fixture 29 and manifolds 22 and 23. These Venturis are connected with passages 130 and 131, passage 131 being connected with tube 37. These passages are formed by tubes which are cast in plate 133. Of course, if the water is lifted from a level below the intake manifold, then the valve 90 and its diaphragm are not necessary; in that event a flat plate is secured to the casting 43 to close the upper part of compartment 92.

By use of the present invention, the efficiency of an automobile engine can be materially increased; the timing for ignition can be advanced at least 4°; standard, as distinguished from tetraethyl, gasoline can be utilized; and mileage per gallon is increased ten to twelve per cent. The life of engine valves, bearings, pistons, and other moving parts, are naturally prolonged over the life of like parts in engines in which water is fed to the fuel mixture constantly. In the latter type, the excess water causes rusting of parts or other chemical reactions take place causing the parts to deteriorate. By the present invention, i. e., when water is delivered to the fuel mixture at such times as to effect greater efficiency under loads from approximately twenty-five percent and upward of the available power of the engine, no deterioration effect, due to corrosion or other chemical reaction, is detectable.

While the forms of embodiment herein shown and described constitute preferred forms, it is to be understood that other forms may be adopted falling within the scope of the claims that follow.

I claim:

1. For use with an internal-combustion engine having a passage for mixture of fuel and air, a device adapted for supplying water from a tank to the said passage, comprising: conduit means adapted to conduct water from the tank to said passage; a plurality of valves in said conduit means; and means adapted to be responsive to pressure variations in said passage for opening one of said valves in response to an increase in pressure in the passage and for opening another of said valves in response to a predetermined higher pressure in the passage.

2. Apparatus as defined in claim 1, characterized in that the conduit means includes parallel passages and one valve controls the flow of water through one of said parallel passages and the other controls the flow of water through the other of said parallel passages.

3. Apparatus as defined in claim 1, characterized in that the first-mentioned valve is engageable with the second-mentioned valve to actuate the latter.

4. Apparatus as defined in claim 1, characterized in that the first-mentioned valve is engageable with the second-mentioned valve to actuate the latter; and further characterized in that the conduit means includes parallel passages and one valve controls the flow of water through one of the parallel passages and the other controls the flow of water through the other of said parallel passages.

5. Apparatus as defined in claim 1, characterized in that the last-named means is adapted to prevent the flow of water to the said passage when the pressure value in said passage falls to a predetermined minimum.

6. For use with an internal-combustion engine having a passage for mixture of fuel and air, a device adapted for supplying water from a tank to the said passage, comprising: conduit means adapted to conduct water from the tank to said passage; pressure responsive means for causing the flow of water through the conduit means; and a plurality of valves in said conduit means; and means adapted to be responsive to the pressure variations in said passage for opening one of said valves in response to an increase in pressure in the passage and for opening another of said valves in response to a predetermined higher pressure in the passage.

7. Apparatus as defined in claim 6, characterized in that the conduit means includes parallel passages and one valve controls the flow of water through one of said parallel passages and the other controls the flow of water through the other of said parallel passages.

8. Apparatus as defined in claim 6, characterized in that the first-mentioned valve is engageable with the second-mentioned valve to actuate the latter.

9. Apparatus as defined in claim 6, characterized in that the first-mentioned valve is engageable with the second-mentioned valve to actuate the latter; and further characterized in that the conduit means includes parallel passages and one valve controls the flow of water through one of the parallel passages and the other controls the flow of water through the other of said parallel passages.

10. Apparatus as defined in claim 6, characterized in that the pressure-responsive means includes a Venturi adapted to be disposed in said mixture passage, said conduit means being connected with the restricted portion of said Venturi.

11. In combination with an internal-combustion engine having a passage for mixture of fuel and air; a tank for water; conduit means for conducting water from the tank to said passage; valve means in said conduit means for modulating the flow of water through the conduit means; a valve for preventing the flow of water through the conduit means; and means associated with said modulating valve means and said valve and responsive to pressure variation in said passage for closing the valve when the engine is idle and for increasing and decreasing the flow of water to said passage through said conduit means in response to increase and decrease, respectively, of pressure in said passage when the engine is in operation.

12. In combination with an internal-combustion engine having a passage for mixture of fuel and air; a tank for water; conduit means for conducting water from the tank to said passage; valve means in said conduit means for modulating the flow of water through the conduit means; means associated with said modulating valve means for increasing and decreasing the flow of water to said passage through said conduit means in response to increase and decrease, respectively, of pressure in said passage; a valve for preventing the flow of water through the conduit means; and means associated with said valve and responsive to pressure in said passage for closing said valve when the engine is idle.

References Cited in the file of this patent

UNITED STATES PATENTS

| | | |
|---|---|---|
| 2,493,808 | Garrigus | Jan. 10, 1950 |
| 2,534,661 | Dieker | Dec. 19, 1950 |
| 2,657,913 | Raymor | Nov. 3, 1953 |
| 2,699,326 | Anderson et al. | Jan. 11, 1955 |